Jan. 19, 1954   R. D. CAMPBELL   2,666,861
TRANSDUCER
Filed Jan. 9, 1952
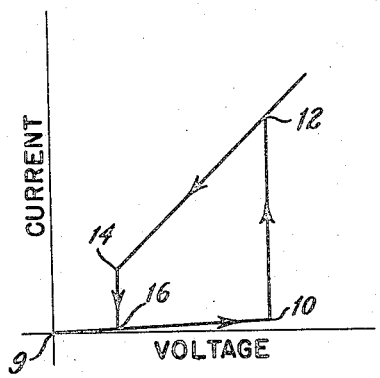
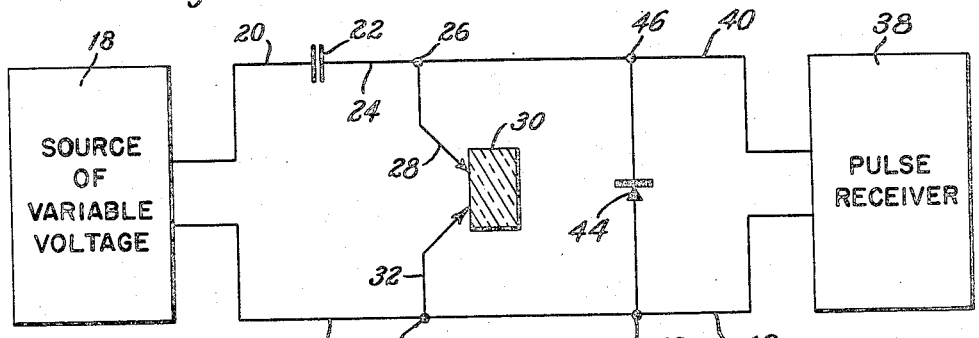
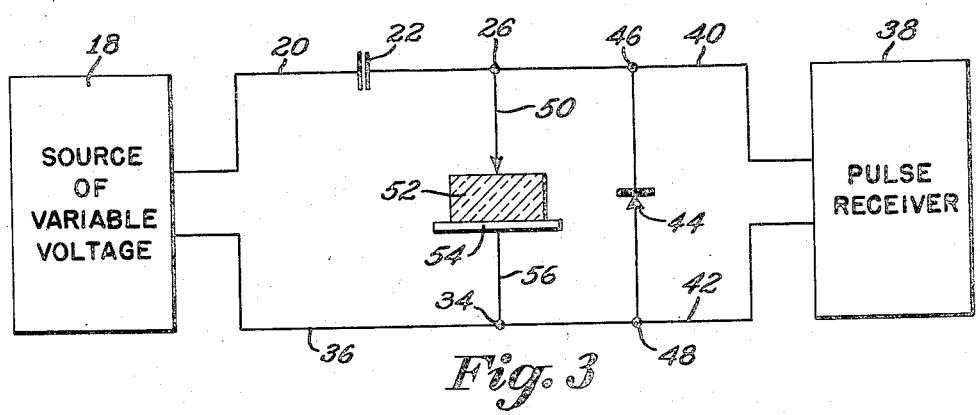
INVENTOR
Richard D. Campbell
BY Raymond W. Colton
ATTORNEY

UNITED STATES PATENT OFFICE 2,666,861

TRANSDUCER

Richard D. Campbell, Brookmont, Md., assignor to Reed Research Inc., Washington, D. C., a corporation of Delaware Application January 9, 1952, Serial No. 265,639

15 Claims. (Cl. 307—88)

This invention relates to transducers for converting an applied voltage into electrical pulses, the number of pulses being a function of the magnitude of the voltage.

Although it is ordinary practice to produce voltages as an indication or record of such values as displacement, velocity, acceleration, pressure, force, power, temperature, humidity, time, frequency and strain, the utilization of such data customarily requires an exercise of the human functions to transpose them to digital values capable of being recorded by such usual practices as punching, notching, marking, or in the form of pulses magnetically or otherwise recorded.

All known efforts to effect such transpositions or conversions automatically, either by electrical or mechanical means or both, have resulted in apparatus which is both complex and expensive, and inadequate from the standpoints of precision and response speeds required by present day practices.

Analog to digital conversion for the presentation of data to computers constitutes an important application of this invention. For such purposes, the recovery time of the transducer should be short enough and the voltage steps small enough to vastly increase the accuracy and speed of prior devices. Proposed applications of gas filled tubes for similar purposes have always been seriously limited by a recovery time of the order of 200 microseconds and voltage steps of the order of 5 to 10 volts.

The transducer contemplated by the present invention comprises an input circuit containing a series reactance, an output circuit, and a semi-conductive body whose voltage-current characteristic includes a closed loop, the semi-conductive body having common connections with the input and output circuits. Input circuit reactances of capacitive types have produced satisfactory results and germanium bodies of various types are eminently suited to serve as the semiconductive bodies or non-linear resistances. Two types of germanium bodies have been successfully employed, the n-type having the common connections made as point contacts to its surface, and the p-type of high resistivity having the common connections made to its surface as a point contact on the one hand and a contact of relatively large area on the other.

To avoid adverse effects of reversed currents, the output circuit may also contain a shunt rectifier which may assume the form of a germanium diode. The input circuit of the transducer will be connected to a variable voltage source and the output circuit to a pulse receiver which may involve electronic counters or other means of accepting and utilizing the pulses.

The transducer has a recovery time of less than 10 microseconds and preferably less than 1 microsecond, and the voltage dimension of the closed loop of its voltage-current characteristic is less than 5 volts and preferably less than 1 volt, ideally being of the order of 0.1 volt.

A more complete understanding of the invention will follow from a description of the attached drawings wherein;

Fig. 1 is the voltage-current characteristic of a suitable semi-conductive body;

Fig. 2 is a circuit diagram depicting one type of semi-conductive body; and

Fig. 3 is a circuit diagram depicting the use of another type of semi-conductive body.

The voltage-current characteristic depicted in Fig. 1 approximates that of a point contact diode formed from high resistivity p-germanium. As a voltage is applied across such a diode, there will be a very small current produced, starting at the origin 9, until the point 10 of the curve is reached, whereupon a small increase in voltage will produce what has sometimes been called a "snap action" characterized by a marked increase in current to a point 12 on the curve. Then, as voltages drop below the value existing at the point 12 of the curve, a substantially proportional reduction in current occurs until a point 14 of the curve is reached, whereupon a small reduction in voltage produces a large reduction in current to a point 16 on the curve which lies on the original portion extending from the origin 9 to the point 10. Thus it will follow that this voltage-current characteristic includes a closed loop 10, 12, 14, 16, 10. For p-type germanium of high resistivity the voltage component or dimension of the base 10, 16 is of the order of 0.1 to 0.2 volt. A somewhat similar characteristic is observed for n-type germanium where two point contacts serve to connect its surface with the input and output circuits of the transducer. In the case of the n-type germanium, the voltage dimension of the closed loop and the recovery time are different than for the p-type germanium of high resistivity. Copper sulfide also provides a voltage-current characteristic containing a closed loop, its precise form being different from that of the germanium bodies. Other non-linear resistances, such as other sulfides, are contemplated by this invention, and it is anticipated that many more materials displaying the necessary properties will be developed.

The input circuit of Fig. 2 contains a source of variable voltage 18 connected by a lead 20 with a capacitor 22 whose other lead 24 extends to a terminal 26 to which is connected a tap 28 making point contact with the surface of a semi-conductive body 30, another tap 32 likewise making point contact with a spaced portion of the surface and extending to a terminal 34 from which a lead 36 extends to the second terminal of the source of variable voltage 18. The output circuit contains a pulse receiver 38 connected by leads 40 and 42 with the terminals 26 and 34 common to the input circuit. The output circuit also contains a shunt rectifier 44 connected to the leads 40 and 42 respectively, at terminals 46 and 48. Thus, it will appear that the semi-conductive body or non-linear resistance 30 has common connections with the input and output circuits. The circuit of Fig. 2 is best adapted for semi-conductive bodies having characteristics similar to that of n-type germanium where two point contacts with the surface of the body are employed.

Fig. 3 illustrates substantially the same circuit as shown in Fig. 2, differing in the mode of connection of the semi-conductive body which is illustrated in Fig. 3 as of the high resistivity p-type germanium or bodies of other materials having similar characteristics. Accordingly, the circuit components and their reference characters are the same in Fig. 3 as in Fig. 2, except for the semi-conductor body itself and its leads. Connected to the terminal 26 of Fig. 3, there is a lead or tap 50 making point contact with the surface of the semi-conductive body 52, another portion of the surface of the body having an extended area contact with a conductive plate 54 which is connected by a lead 56 with the terminal 34.

In either circuit illustrated, current flows readily through the semi-conductive body for one polarity of applied voltage, and indifferently for the opposite polarity. Since destruction of the useful properties of the semi-conductor may result from the application of a reverse voltage, the diode 44, which may be thermionic or semi-conductive, is included to carry such reverse currents and thereby prevent the occurrence of excessive reverse voltages.

The combined performance of the voltage source 18, capacitor 22 and the non-linear circuit element 30 or 52 can be described advantageously by reference to Fig. 1.

As the voltage of the source 18 is gradually increased, negligible current will flow as indicated by the small slope of the characteristic lower base line 9, 16. Accordingly, little charge is placed upon the capacitor 22, and the voltage across terminals 26, 34 substantially equals the applied voltage. When the applied voltage increases to the value 10, large current conduction suddenly occurs and capacitor 22 is rapidly charged to a value represented by the horizontal component of 16, 10 of Fig. 1. As this charge is acquired, the voltage across the non-linear circuit element 30 or 52 will diminish; and when this voltage reaches the value represented by point 16 of Fig. 1, the high conduction condition will suddenly terminate, leaving a negligible flow of current.

As the voltage of the source 18 continues to increase there will be available across points 26, 34, a voltage equal to the input voltage minus the voltage implanted upon the capacitor 22 by this first sequence of operation of the transducer.

This difference voltage will increase until point 10 is again reached when a second "snap action" is initiated and a second similar sequence of events will ensue. It is evident that continued increase of voltage of the source 18 will thus cause a number of such sequences or steps and that the total number of such steps will be approximately proportional to the final value attained by the voltage source 18.

In the preferred application of the device, the input signal will be supplied as a voltage whose rate of rise is substantially uniform to a peak value and which later is reduced to a base or starting value. The next sample of input signal is then utilized in the same way and it will produce a different number of steps if it attains a different peak value. Discharge of the capacitor 22 is effected by the diode 44 during the interval in which the applied voltage is reduced to its base or starting value.

No effort has been made to outline the large numbers of applications of this invention and accordingly, the examples illustrated and described should not be construed as limiting the invention beyond the scope of the appended claims.

I claim:

1. A transducer for translating quantitative values into pulses comprising an input circuit containing a quantitative voltage source and a series reactance, an output circuit, and a semi-conductive body whose voltage-current characteristic includes a closed loop, said body having common connections with said circuits.

2. A transducer for translating quantitative values into pulses comprising an input circuit containing a quantitative voltage source and a series capacitive reactance, an output circuit, and a semi-conductive body whose voltage-current characteristic includes a closed loop, said body having common connections with said circuits.

3. A transducer for translating quantitative values into pulses comprising an input circuit containing a quantitative voltage source and a series reactance, an output circuit, and a semi-conductive germanium body whose voltage-current characteristic includes a closed loop, said body having common connections with said circuits.

4. A transducer for translating quantitative values into pulses comprising an input circuit containing a quantitative voltage source and a series reactance, an output circuit, and a semi-conductive n-type germanium body whose voltage-current characteristic includes a closed loop, said body having two point contacts providing common connections with said circuits.

5. A transducer for translating quantitative values into pulses comprising an input circuit containing a quantitative voltage source and a series reactance, an output circuit, and a semi-conductive high resistivity p-type germanium body whose voltage-current characteristic includes a closed loop, said body having a point contact and a contact of relatively large area providing common connections with said circuits.

6. A transducer for translating quantitative values into pulses comprising an input circuit containing a quantitative voltage source and a series reactance, and output circuit containing a shunt rectifier, and a semi-conductive body whose voltage-current characteristic includes a closed loop, said body having common connections with said circuits.

7. A transducer for translating quantitative values into pulses comprising an input circuit containing a variable unidirectional voltage source and a series reactance, an output circuit, and a semi-conductive body whose voltage-current characteristic includes a closed loop, said body having common connections with said circuits.

8. A transducer for translating quantitative values into pulses comprising an input circuit containing a quantitative voltage source and a series reactance, an output circuit containing a pulse receiver, and a semi-conductive body whose voltage-current characteristic includes a closed loop, said body having common connections with said circuits.

9. A transducer for translating quantitative values into pulses comprising an input circuit containing a variable unidirectional voltage source and a series reactance, an output circuit containing a pulse receiver, and a semi-conductive body whose voltage-current characteristic includes a closed loop, said body having common connections with said circuits.

10. A transducer for translating quantitative values into pulses comprising an input circuit containing a quantitative voltage source and a series reactance, an output circuit, and a semi-conductive body whose voltage-current characteristic includes a closed loop, said body having common connections with said circuits, said transducer having a recovery time of less than 10 microseconds.

11. A transducer for translating quantitative values into pulses comprising an input circuit containing a quantitative voltage source and a series reactance, an output circuit, and a semi-conductive body whose voltage-current characteristic includes a closed loop, said body having common connections with said circuits, said transducer having a recovery time of less than 1 microsecond.

12. A transducer for translating quantitative values into pulses comprising an input circuit containing a quantitative voltage source and a series reactance, an output circuit, and a semi-conductive body whose voltage-current characteristic includes a closed loop having a voltage dimension less than 5 volts, said body having common connections with said circuits.

13. A transducer for translating quantitative values into pulses comprising an input circuit containing a quantitative voltage source and a series reactance, an output circuit, and a non-linear resistance whose voltage-current characteristic includes a closed loop having a voltage dimension less than 1 volt, said body having common connections with said circuits.

14. A transducer for translating quantitative values into pulses comprising an input circuit containing a quantitative voltage source and a series reactance, an output circuit, and a non-linear resistance whose voltage-current characteristic includes a closed loop having a voltage dimension of the order of 0.1 volt, said body having common connections with said circuits.

15. An analog to digital converter comprising an input circuit containing a variable voltage source and a capacitor in series, an output circuit containing a pulse receiver, and a semi-conductive body whose voltage-current characteristic includes a closed loop having a voltage dimension of the order of 0.1 volt, said body having common connections with said circuits, and said converter having a recovery time of less than 1 microsecond.

RICHARD D. CAMPBELL.

References Cited in the file of this patent

UNITED STATES PATENTS

| Number | Name | Date |
|---|---|---|
| 2,556,200 | Lesti | June 12, 1951 |
| 2,565,497 | Harling | Aug. 28, 1951 |